US009328773B2

(12) United States Patent
Seppi

(10) Patent No.: US 9,328,773 B2
(45) Date of Patent: May 3, 2016

(54) SYSTEM FOR THE ADJUSTMENT OF TWO DRIVE SHAFTS CONNECTED BY MEANS OF A CARDANIC SHAFT

(71) Applicant: Seppi M. Spa, Kaltern (IT)

(72) Inventor: Lorenz Seppi, Kaltern (IT)

(73) Assignee: SEPPI M. SPA, Kaltern (IT)

( * ) Notice: Subject to any disclaimer, the term of this patent is extended or adjusted under 35 U.S.C. 154(b) by 0 days.

(21) Appl. No.: 14/504,845

(22) Filed: Oct. 2, 2014

(65) Prior Publication Data
US 2015/0159701 A1    Jun. 11, 2015

(30) Foreign Application Priority Data
Oct. 8, 2013   (IT) .............................. BZ2013A0049

(51) Int. Cl.
*A01B 71/06*    (2006.01)
*F16D 3/30*    (2006.01)
*B62D 49/02*    (2006.01)

(52) U.S. Cl.
CPC . *F16D 3/30* (2013.01); *A01B 71/06* (2013.01); *A01B 71/063* (2013.01); *A01B 71/066* (2013.01); *B62D 49/02* (2013.01)

(58) Field of Classification Search
CPC ...... B62D 49/02; A01B 71/063; A01B 7/066; A01B 71/06; A01D 89/004
See application file for complete search history.

(56) References Cited

U.S. PATENT DOCUMENTS

| | | | | |
|---|---|---|---|---|
| 2,869,660 A * | 1/1959 | Krause | ..................... | B60D 7/00 180/14.4 |
| 5,408,887 A * | 4/1995 | Roth | ..................... | A01B 71/06 73/862.191 |
| 6,347,504 B1 * | 2/2002 | Willibald | ............... | A01B 71/06 56/257 |
| 6,454,041 B2 * | 9/2002 | Ishimori | ................ | A01B 71/06 180/312 |
| 6,594,978 B2 * | 7/2003 | Viaud | ..................... | A01F 15/10 56/10.2 E |
| 6,672,568 B1 * | 1/2004 | Rawlinson | ........... | A01B 59/066 254/323 |
| 6,988,571 B2 * | 1/2006 | Okamoto | ............... | B62D 49/02 172/292 |
| 7,575,077 B2 * | 8/2009 | Priepke | ................ | A01B 71/063 172/272 |
| 8,950,523 B2 * | 2/2015 | Stauvermann | ......... | A01B 71/06 180/14.1 |
| 9,033,074 B1 * | 5/2015 | Gates | ..................... | A01B 71/06 172/272 |
| 2014/0342863 A1 * | 11/2014 | Willibald | ............... | A01B 71/06 474/148 |

FOREIGN PATENT DOCUMENTS

IT    1379111    4/2007

* cited by examiner

*Primary Examiner* — Nicole Verley
(74) *Attorney, Agent, or Firm* — Jacobson Holman, PLLC.

(57) ABSTRACT

A system for the mutual adjustment of two drive shafts connected by means of a cardanic shaft is described, the first shaft being actuated by a machine by means of a power take-off being connected to a cardanic shaft, said cardanic shaft being connected to a second shaft being a power take-off of a miter gear box of a crusher/tiller, the miter gear box actuating at least one machine tool. According to the invention the miter gear box is connected to the chassis of the crusher/tiller by means of two small arms in order to allow both a rotation about one axis and a transverse movement controlled by a tilting and rotation sensor.

4 Claims, 5 Drawing Sheets

SYSTEM FOR THE ADJUSTMENT OF TWO DRIVE SHAFTS CONNECTED BY MEANS OF A CARDANIC SHAFT

The present invention relates to a system for the adjustment of two drive shafts connected by means of a cardanic shaft. From the prior art it is known that for the uniform transmission of movement by means of a cardanic shaft the motion input and output angles must always be kept as equal as possible. This way any irregularities produced by a cardanic joint are mutually cancelled. In the current state of the art there are mechanisms adapted to keep the drive shaft and non-drive shaft in such a configuration that the input and output angles stay the same during the use of such machines, but these mechanisms are complicated. From document IT 1 379 111 a compensation system is known, to be used in the transmission of power between a tractor comprising a first axis called a 'drive shaft' and a tractor comprising a second axis called a 'non-drive shaft', connected to a gear box pivotally attached to said tractor with respect to a substantially horizontal and orthogonal axis to said non-drive shaft, said first and second axes being concurrent and connected by a cardanic shaft, and forming respectively with it an alpha angle and a beta angle on a first substantially vertical plane, said system comprising: —a first pair of supports arranged on a second substantially vertical plane, whose first support is integral to the tractor and has a hinge point, a second support is integral with the gear box and has a hinge point, said first and second supports being respectively in a staggered position with respect to the cardanic shaft; a second pair of supports arranged on a third substantially vertical and opposite plane to said second vertical plane with respect to the cardanic shaft, whose third support is integral with the tractor and has a hinge point, a fourth support is integral with the gear box and has a hinge point, said third and fourth supports being respectively in a staggered position with respect to the cardanic shaft and opposite with respect to said first and second supports being able to vary their length and being constrained to one another to substantially keep the same respective lengths, the arrangement being such that said alpha and beta angles are identical in every operating condition. Despite having considerable advantages, this system is still too complex in its production and adjustment. The object of the present invention is to improve the adjustment system of the non-drive motion input angle with the highest transmission flexibility. This object is achieved by a system for the mutual adjustment of two drive shafts connected by means of a cardanic shaft, the first shaft being actuated by a machine whose power outlet is connected to a cardanic shaft by means of a cardanic joint, said cardanic shaft being connected to a second shaft, represented by a power take off of a mitre gear box of a crusher/tiller, the mitre gear box actuating at least one machine tool, and the mitre gear box is connected to the crusher/tiller chassis by means of at least two small arms in order to allow both the rotation about an axis and a transversal movement so that the second shaft is always arranged in such a way that both the 'ideal' axes form an isosceles triangle. In a preferred embodiment, the small arms are arranged at 10°-170° between one another. In this way, the axis of the second shaft in the initial position is substantially parallel to the axis of first shaft. Moreover, this system is particularly advantageous for machines which both crush and trim, since the angles for performing the machining are different. With the system according to the invention it is possible to more easily adjust the angle of the tools by means of the mitre gear box which can be both rotated and moved. In order to adjust the position, a tow bar of variable length can be provided. The mitre gear box can be also connected to various rotors in series carrying tools.

Further characteristics will be clear in a non-limiting way from the drawing and the preferred embodiment described in which.

Figure 1:
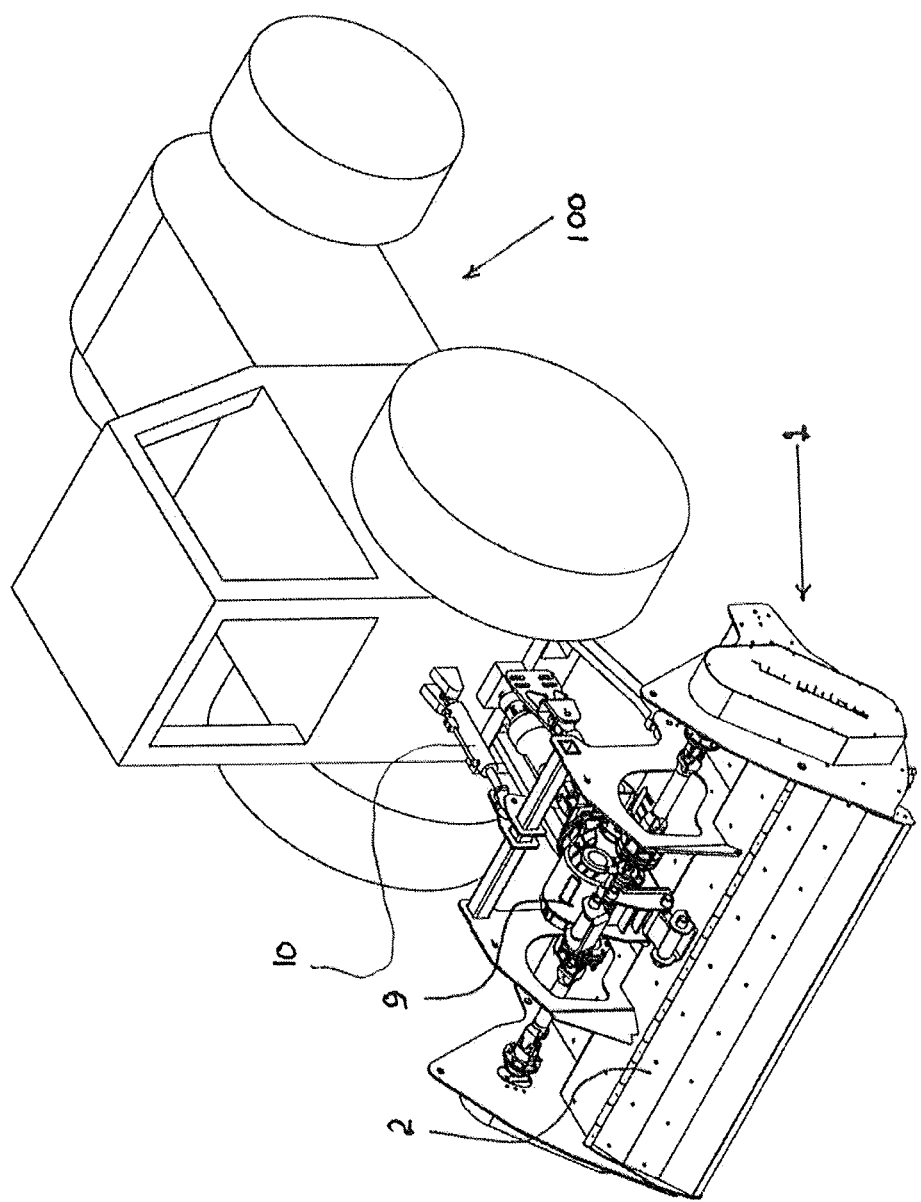
FIG. 1 is a perspective view of a traction device with a crusher/tiller.
Figure 2:
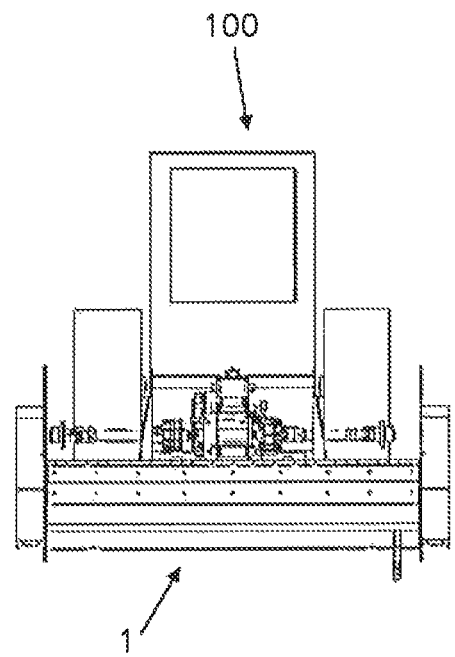
FIG. 2 is a rear view of a traction device with a crusher/tiller.
Figure 3:
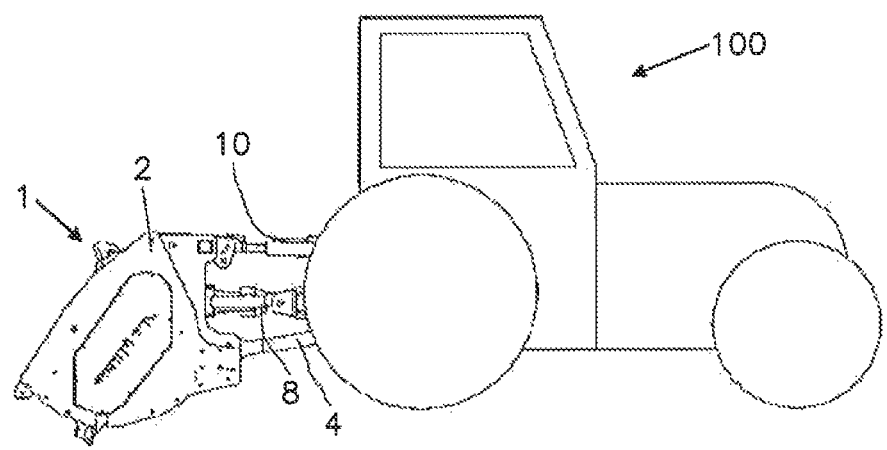
FIG. 3 is a lateral view of a traction device with a crusher/tiller.
Figure 4:
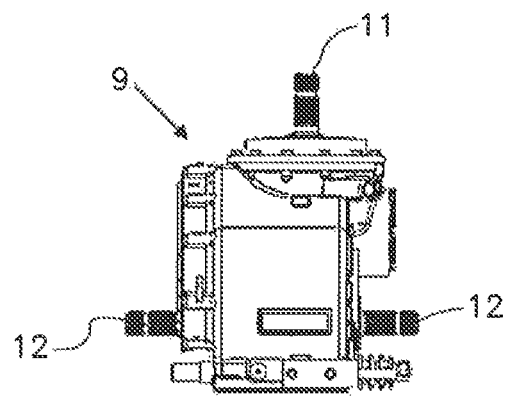
FIG. 4 is a mitre box.
Figure 5:
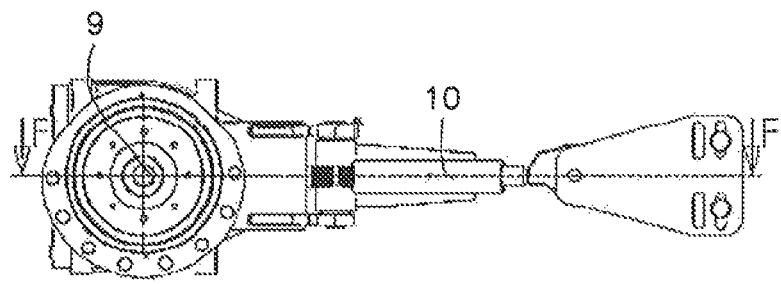
FIG. 5 is a top view of the connection between the traction device and the crusher/tiller.
Figure 6:
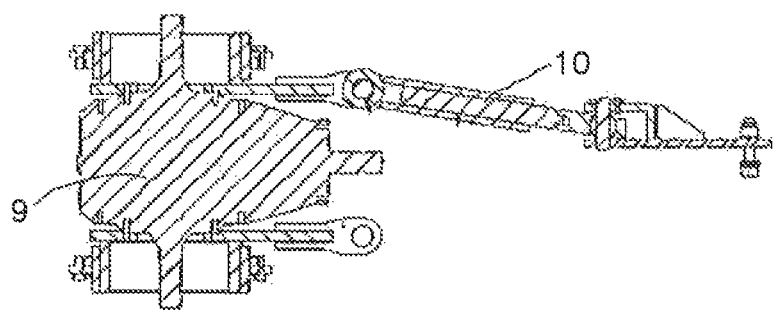
FIG. 6 shows a section of FIG. 5.
Figure 7:
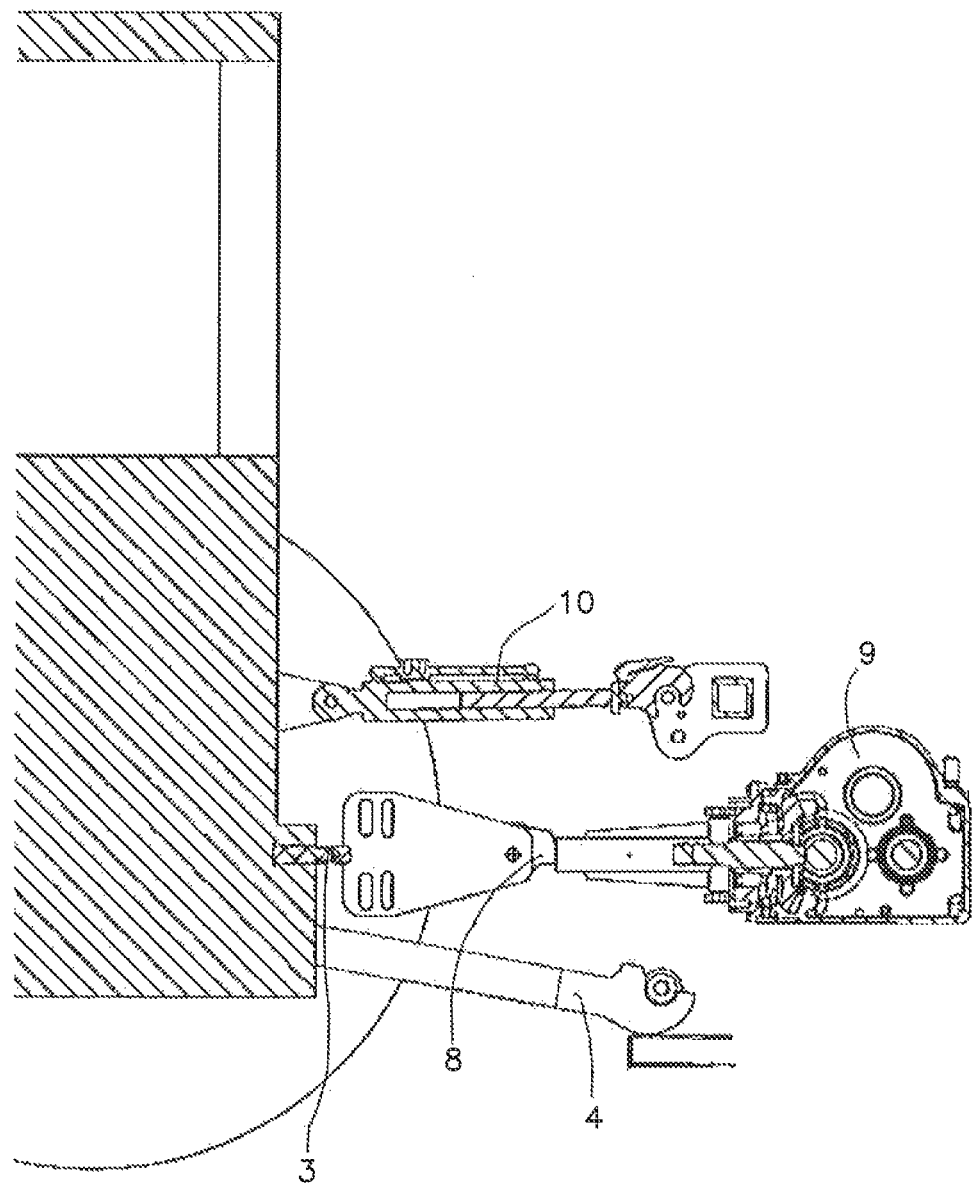
FIG. 7 shows a section of the connection between the device and the crusher/tiller.
Figure 8:
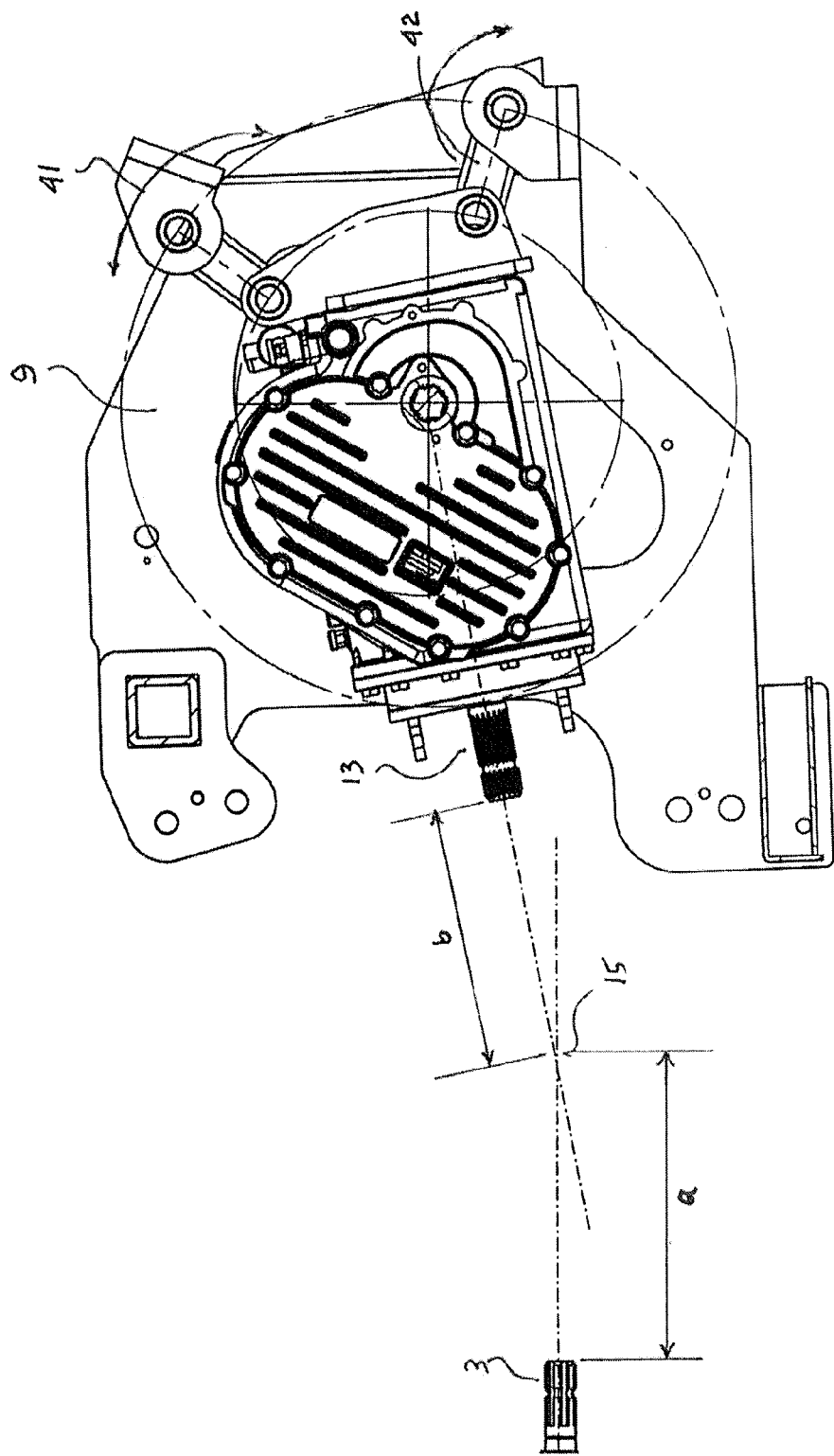
FIG. 8 is a mitre box fixed according to the invention in a crusher/tiller.

in FIG. 1 a machine, preferably a tractor, is indicated by reference number 100. This tractor 100 is connected to a crusher/tiller 1. This connection by means of bars 4 is required to tow the crusher/tiller. Moreover, machine 100 transmits a torque through a shaft 5. This shaft 5 is connected by means of a cardanic shaft 8 to a drive shaft 7 which powers a mitre gear box 9 which is adapted to be connected at the output to at least one tool-holder, which for example carries tools for crushing/tilling. The shaft 5 and shaft 7 must be arranged in an isosceles triangle in order to guarantee optimal operation. This gear box 9 is connected to the tiller 1 chassis according to the invention by means of at least two small arms 41, 42. These two small arms 41, 42 allow the mitre gear box to be rotated about an axis. This way shaft 5 and shaft 8 substantially form an isosceles triangle.

Moreover, this adjustment is particularly advantageous for combined crusher/tiller machines, since the tool angle must be changed for the crushing and tilling operations. The adjustment of the mitre gear box can preferably occur by means of a tow bar 10. This way it is possible to adjust both the distance from the crusher/tiller chassis and the orientation. This tow bar 10 can be of telescopic type in order to allow easier adjustment. The system according to the invention in one embodiment defines that the ratio between the length from the power outlet 3 and the centre of rotation 15 between the power outlet 3 and the power take-off 13 and the length from the centre of rotation 15 between the power outlet 3 and the power take-off 13 and the power take-off 13 remains constant.

KEY OF REFERENCE NUMBERS 1 crusher/tiller
2 chassis
3 power outlet
4 bars
5 shaft
7 drive shaft
8 cardanic shaft
9 mitre gear box
10 tow bar
11 gear box input
12 gear box outputs
13 power take-off
15 centre of rotation
41, 42 small arms
100 machine

The invention claimed is:

1. A system for the mutual adjustment of two drive shafts connected by means of a cardanic shaft, the first shaft being actuated by a machine by means of a power take-off being connected to a cardanic shaft, said cardanic shaft being connected to a second shaft being a power take-off of a mitre gear box of a crusher/tiller, the mitre gear box actuating at least one machining tool, wherein the mitre gear box is connected to the chassis of the crusher/tiller by means of at least two small arms in order to allow both the rotation about an axis and a transverse movement controlled by a tilting and rotation sensor.

2. The system according to claim 1, wherein the ratio of the length from a power outlet and the centre of rotation between the power outlet and power take-off and the length from the centre of rotation between the power outlet and the power take-off remains constant.

3. The system according to claim 1, wherein the small arms are arranged at 10°-170° from one another.

4. The system according to claim 1, wherein the gear box is controlled by a telescopic tow bar.

\* \* \* \* \*